Nov. 28, 1961  F. L. CHAPPELL  3,010,886
APPARATUS FOR PURIFYING WATER CIRCULATING SYSTEMS
Filed March 3, 1958  2 Sheets-Sheet 1
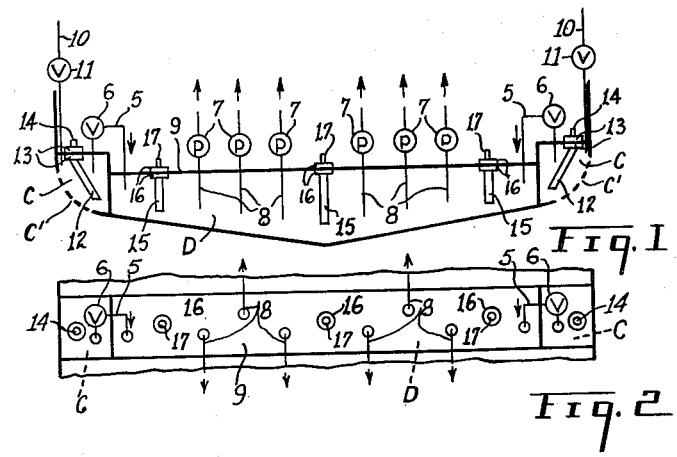
Fig. 1
Fig. 2
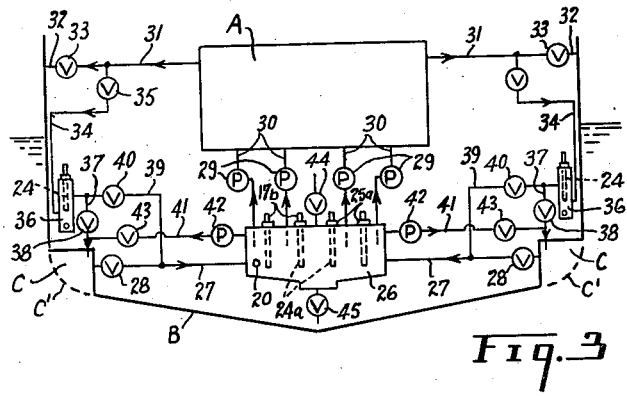
Fig. 3
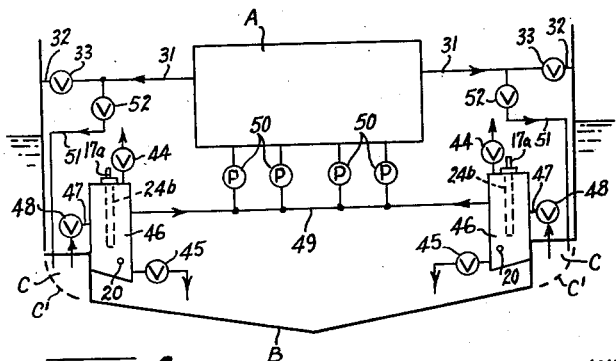
Fig. 4
INVENTOR
F. L. CHAPPELL
By Fetherstonhaugh & Co.
ATTORNEYS Nov. 28, 1961   F. L. CHAPPELL   3,010,886
APPARATUS FOR PURIFYING WATER CIRCULATING SYSTEMS
Filed March 3, 1958   2 Sheets-Sheet 2

INVENTOR
F. L. CHAPPELL

By Fetherstonhaugh & Co.
ATTORNEYS

United States Patent Office 3,010,886
Patented Nov. 28, 1961

3,010,886
APPARATUS FOR PURIFYING WATER
CIRCULATING SYSTEMS
Frank Lewis Chappell, 955 Trans Canada Highway,
Victoria, British Columbia, Canada
Filed Mar. 3, 1958, Ser. No. 718,732
6 Claims. (Cl. 204—149)

This invention relates to a method of purifying water circulating systems, particularly water circulating systems in ships and in shore installations where the water is apt to contain marine growth and other deleterious matter.

The invention consists essentially in first circulating the water, either sea water or fresh water, through a main treatment tank where it is subjected to electrolytic treatment through the medium of an impressed D.C. electric current on electrodes of copper, arsenical copper, selenium copper, copper aluminum alloys, aluminum, aluminum alloys, carbon, iron and manganese in combinations which will act upon the circulating water to effect the elimination of all harmful constitutents, and to pass all or a portion of the return flow of the treated water through a booster treatment tank into that portion of the system leading to the incoming side of the main treatment tank. Where the treatment is applied to circulating water on board ships, it has been found most beneficial to pass the return flow after booster treatment directly into the sea-chest from which the circulating water is drawn, thereby giving protection to an area of the ship's hull around the perforated inlet of the sea-chest in addition to protection to the complete circulating system, including that portion between the water intake and the main treatment tank of the system.

Various attempts have been made to eliminate bacterial slime, weeds, algae, mussels, barnacles and all types of shell fish in circulating water which adhere to and attack the metal surfaces in circulating systems causing blockage and corrosion of pipes and fittings of all metallic materials; to eliminate "impingement" attack on copper piping, caused by entrained air in the system; and erosion caused by grit and sand or any other foreign material carried into the system. Such attempts have only been partially effective as they act only in the direction of flow and take no account of the incoming flow up to the point of treatment.

The primary object of this invention is to provide a purifying system for circulating water which will effect elimination of harmful elements from all parts of the circulating system including the inlet to the system.

A further object of the invention is to create a volume of purified water at the point of entry of the water into a circulating system.

A further object of the invention is to provide means whereby all or a portion of the return flow of the treated water is given a booster treatment and then introduced back into the system at its source point.

A further object of the invention is to provide a system of purifying and protecting fresh water systems for either commercial or domestic use.

A further object of the invention is to provide a water system in which the water is de-aerated for the purpose of eliminating air in the system harmful to piping etc.

These and other objects will be apparent from the following specification and the accompanying drawings, in which:

FIGURE 1 is a vertical cross section of the bottom portion of the hull of a ship showing diagrammatically the purifying and protective system applied to the suction chests and sea-well built into the ship's bottom.

FIGURE 2 is a partial plan view of the ship's bottom showing the anodes and connections of the system through the top of the suction chests and sea-well.

FIGURE 3 is a diagrammatical vertical section through a ship showing the purifying and protective system applied to the water circulating system of a ship in which a main treatment tank and booster treatment tanks are employed.

FIGURE 4 is a diagram similar to FIG. 1 but showing a pair of main treatment tanks without a booster in the return line of the system.

Figure 6:
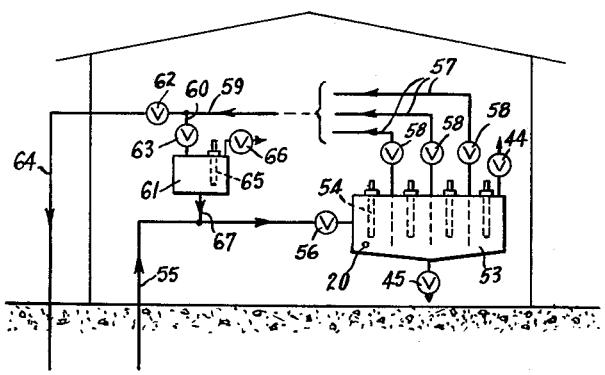
FIGURE 6 is a diagram showing a water treatment system as applied to a commercial installation.

Referring to the drawings and particularly to FIGS. 1 to 5 inclusive, where the purifying and protecting of the water circulation is applied to a shipboard system. Such a system can be used beneficially on ships operating in either salt or fresh water, for it is understood that agents causing damage to both the ship and all installations coming into contact with the water, are present in both salt and fresh water. Such damaging agents, whether in salt or fresh water, can be destroyed by the same general method with only slight changes in operating procedure.

In FIGS. 1 and 2 a simple form of the purifying and protective system particularly applicable in new ships is shown, which are constructed with a double bottom, where a transverse section of the double bottom can be set aside to receive from the sea chests all of the sea water required for circulating purposes in a ship. The ship's hull B is provided with the sea water suction chests C on either side of the ship. Each of these sea water suction chests are provided with a perforated plate C' which will allow free entry of the sea water but will keep out most solid matter. The sea-well section D in FIGURES 1 and 2 of the double bottom of the ship extends the full width of the ship between the sea chests C and is generally about the same width as the sea chests and provides a common receiving tank into which the water from the suction chests is delivered. The entry of sea water from the sea chests C to the sea-well D is through the pipe connections 5 and is controlled by the valve 6. The reservoir of water in the sea-well D is drawn on by the various sea water circulating systems of the ship by means of their individual pumps 7 connected to the stand pipes 8 projecting down through the top wall 9 into the sea-well D. Return lines 10 from the various circulating systems in the ship lead back to the sea chests C and are controlled by the valves 11.

Each of the sea chests C is provided with one or more anodes 12, insulated from the walls of the sea chests by ths insulators 13, each anode 12 having a terminal 14. A similar series of anodes 15 are inserted through the top wall 9 of the sea-well D and are provided with insulators 16 and terminals 17. The size of the sea chests C and sea-well treatment tank D and the number of anodes 12 and 15 employed will depend on the volume of water required in the circulating systems of the ship and will also depend upon the length of piping throughout the whole circulating system.

Figure 5:
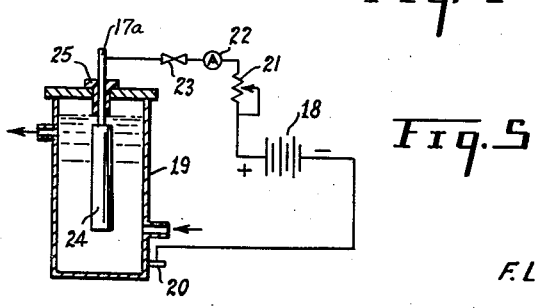
FIGURE 5 is a simple diagram showing a treatment tank with its electrical connections.

Suitable electrical connections are made between the terminals 14 and 17 and a source of D.C. power, such as the positive side of the battery 18 to the terminal 17a, the negative side of the battery being connected with the walls of the sea chests C and the seal-well D in the same manner as the battery is connected to the tank 19 at the terminal 20 as shown in FIGURE 5, the walls of the sea chests and sea-well acting as the cathode of the treatment system. The output from the battery 18 to the anodes 12 and 15 may be regulated by the variable resistor 21 and be provided with an ammeter 22 and fuse 23. The anode 24 in the tank 19 is representative of the anodes 12 and 15 and is insulated from the tank 19 by the insulator 25. The voltage applied to the anodes and the anode current flow is generally the same as similar prior art systems and may be approximately 10 volts with the current per anode ranging from 3 to 5 amperes as taught in British Patent 662,625. A rectifier may be used in place of the battery 18 where A.C. current is readily available.

In FIG. 3 a system is shown particularly applicable for installation in new ships where it is not possible to use a double bottom tank as a sea-well as shown in FIGS. 1 and 2 but where ample provision can be made for a centralized system. In such an installation the rectangle A represents a group of equipment throughout the ship served by circulating sea water. The ship's hull B is provided with the sea water inlet chests or suction boxes C protected by the perforated plates C'. It is to be understood that the group of equipment A served by sea water could be entirely separate circulating systems served from a common treatment tank or from separate treatment tanks depending on circumstances.

The main treatment tank 26 is located in any convenient position within the ship and is provided with a series of anodes 24a insulated from the tank by the insulators 25a, and having the terminals 17b projected above the insulators similar in every respect to the anodes 12 and 15 described above. Suitable electrical connections are made to a source of D.C. power in the same manner as described above in connection with the system shown in FIGS. 1 and 2. The size of the treatment tank 26 and the number of anodes within the tank will depend on the volume of water required in the systems A and also depend upon the length of piping throughout the whole circulating system.

The water suction lines 27 from the suction chests C are controlled by the valves 28 and should be made as short as possible. Pumps 29 draw the water from the treatment tank 26 and pass the water through the lines 30 to the various systems, such as for cooling, drinking, fire, bilge and ballast and sanitary purposes and here shown generally grouped at A. The discharge lines 31 from these various systems connect to a main overboard discharge 32 above the waterline and are controlled by the shut-off valve 33. It has been found that the treated water in the discharge lines 31 retains a high percentage of its purifying properties which, when discharged overboard and particularly when the ship is stationary, will have a beneficial effect in the water surrounding the hull by destroying organisms which would otherwise attach themselves to the hull.

Return lines 34 controlled by the valves 35 lead from the discharge lines 31 to the booster treatment tanks 36 which are fitted with an anode 24 and are connected to the source of electrical current 18 as shown in FIG. 5. The discharge from the booster tanks 36 is fed through the lines 37 into the sea chests C and are controlled by the valves 38. The discharge from the booster treatment tanks 36 may be fed through the lines 39 directly into the main suction lines 27, the lines 39 being controlled by the valves 40. The by-pass from the booster tank 36 into the main suction line 27 is of particular benefit as it provides an engine warm-up cycle of treated water of particular advantage when the engines are being started up. Should it be necessary to shut down one or both of the booster treatment tanks 36, the treated water in the main treatment tank 26 can be discharged through the lines 41 by the pumps 42 directly into the sea chests C, the lines 41 being controlled by the valves 43.

The main treatment tank 26 and the booster tanks 36 are fitted with automatic de-aerator valves 44 (not shown on booster tanks 36) for the purpose of eliminating air from the circulating systems, air which otherwise has a corrosive effect on iron and steel piping and has the effect of eliminating "impingement" attack on copper piping.

The main treatment tank 26 acts as a trap for grit and sand drawn in through the sea chests C and the sand and grit is easily eliminated from the tank by the blow-down valve 45.

In FIG. 4 a modified form of the system of FIG. 3 is shown, which performs all the functions of the system shown in FIGS. 1 and 3 but is more suitable for installations in ships after they have been put into service. In this modification separate main treatment tanks 46 are shown. These tanks 46 are located on the port and starboard sides of the ship as close as possible to the sea chests C and are equipped with anodes 24b and connected as shown in FIG. 5. In this case the suction lines 47 can be very short and are controlled by the valves 48. The discharge from both tanks 46 is into a common line 49 from which the pumps 50 circulate the water through the various systems in the ship as represented by A as in FIG. 4. The main discharge overboard from the various systems represented at A is the same as in FIG. 3 through the pipes 31 and 32 and valves 33. Branch pipes 51 lead directly from the discharge pipes 31 into the sea chests C and are controlled by the valves 52. Each tank 46 is equipped with de-aerator valves 44 and blow-down valves 45 as in FIG. 3.

The variations between FIGS. 1, 3 and 4 are concerned with installation FIGS. 1 and 3 only, the first two installations being suitable for new ship construction and the third FIG. 4 for ships already in operation in which it is desired to obtain the benefits of the system shown in FIGS. 1 and 3 but in which it is impossible to install one central main treatment tank. The functioning and the end results of all installations shown, so far as protection to the circulating systems of the ship are concerned, are the same.

Similar results can be obtained in the treatment of the water used in commercial plants. This is shown in FIG. 6 where the main treatment tank 53 is equipped with anodes 54 and with insulators and terminals similar to the anodes previously described in connection with FIGURES 1, 3 and 4, deaerator valve 44 and blow-down valve 45 as in the case of FIGS. 3 and 4. The electrical connections to the anodes 54 and tank 53 are the same as disclosed in FIG. 5. The main water inlet 55 can be drawn from any pressure water system and controlled by the valve 56. If the water is drawn from a well then a pump can be fitted in the line 55. After the water passes through the tank 53 it is fed through the pipes 57, each controlled by a valve 58, to the various circulating systems in the plant and eventually are directed into the discharge pipe 59. A branch pipe 60 from the discharge pipe 59 leads to the booster treatment tank 61. Valves 62 and 63 on the lines 59 and 60 control the flow of water allowed to discharge through the pipe 64 and to flow into the booster tank 61. The booster tank 61 is equipped with anodes 65 and de-aerator valve 66 and is connected up to the electrical system as shown in FIG. 5. The discharge from the booster tank 61 is through the line 67, into the main supply line 55.

Figure 7:
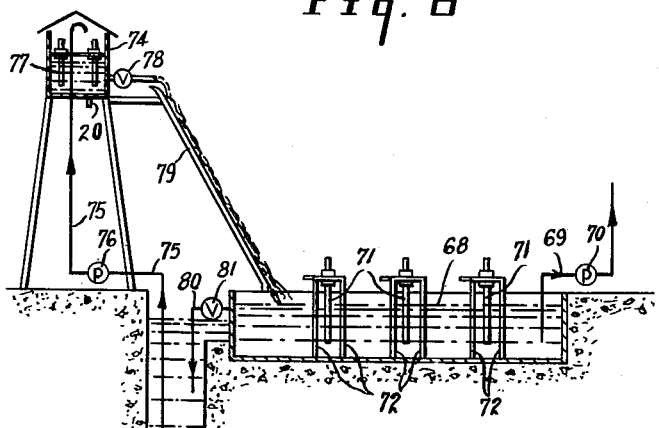
FIGURE 7 is a diagram showing a water treatment system as applied to a domestic water supply.

In FIG. 7 the water protective system is shown applied to a domestic water supply in which the water is stored in the reservoir 68. Water is drawn from the reservoir 68 through the distribution pipe 69, by means of the pump 70. The water in the reservoir 68 is treated by means of the anodes 71 and cathodes 72, the anodes 71 being connected to the positive side of a D.C. supply and the cathodes 72 being connected to the negative side of that supply in the manner shown in FIG. 5. In the case of a large reservoir it is not normally feasible to connect the reservoir itself, as the cathode, to the negative line of the D.C. supply therefore it is more practicable to have combined anode-cathode assemblies as shown in FIG. 7. The water supply to the reservoir 68 is shown in the open well 73, from which the water is pumped up into the tank 74 through the pipe 75 by the pump 76. The tank 74 is fitted with anodes 77, complete with insulators and terminals similar to that shown in FIG. 5. The tank 74 acts as a cathode and is provided with a negative terminal 20 and the connections to the D.C. supply is as shown in FIG. 5. As the water in the tank 74 is treated, it is allowed to flow out through the valve 78 and down over the cascade 79 into the reservoir 68. The pipe 75 and pump 76 are protected by allowing a discharge of treated water from the reservoir 68 to flow into the well 73 through the pipe 80, this discharge being controlled by the valve 81.

All of the anodes in the main treatment tanks, seawell D, 26, 46, 53 or reservoir 68 are electrodes of copper, arsenical copper, selenium copper or combinations of copper electrodes with other electrodes of carbon, iron, aluminum or alloys of same, the combinations being selected which will best effect the elimination of harmful bodies present in the water to be treated. The anodes in the sea chests C and booster tanks 36, 61 and 74 may be the same as those in the main treatment tanks or they may be of alternative types of alloys. For instance, copper alloys have been found to be very effective in destroying bacteria and marine organisms. Copper alone, although effective for this purpose, is a promoter of corrosion when in solution, therefore great care must be exercised and effective measures taken through the medium of alloying the various metals with copper, and therefore would be most effective in the main treatment tank where the bulk of the incoming water is treated. Aluminum greatly strengthens the solution in the treated water which has been weakened due to the length of piping in the system through which the water has been passed. Aluminum, because of its highly gelatinous hydroxide, is particularly desirable owing to its cleansing properties. Iron has a similar effect, but is undesirable in some cases owing to its oxides colouring the water. However, the coloured water is of little account in some cooling systems in which case it is used for the sake of economy. Arsenical copper anodes in which arsenic has been added to the copper to the extent of approximately 6% to 7% has been found to be at least 40% more potent than straight copper. The arsenic will not melt, therefore it remains in the alloy as thousands of small gas pockets which are released as the copper wears away. In this way the release of arsenic into the water is controlled by the wearing away of the copper. Therefore, the selection of the electrodes forming the anodes of the system are of the utmost importance considering the initial condition and analysis of the water entering the system; the length of the system through which the water has to pass, and the strength of the solution in the water as it is introduced into the booster treatment tanks. The automatic de-aeration of the system at both main and booster tanks greatly increases the degree of protection given to the system as it eliminates the oxygen which normally breaks down the hydrogen film present on the metal surfaces being protected.

As protection by any electrolytic method can only be sustained in the direction of water-flow the use of a main treatment tank or tanks at or near the source of incoming water is of particular advantage in that the treatment is applied not only to the incoming water but also to the entrained sand and grit or other solid matter, with provision made at the tank for such solid matter to settle to the bottom and be blown out of the tank with the least disturbance to the circulation of the treated water. As the solid matter blown down out of the treatment tank or tanks carries with an amount of treated water the mechanism by which the solid matter is carried off is also protected.

By the use of the above described system of purifying the water in a circulating system, whether on floating vessels, or on land installations for commercial or domestic use, the water being introduced into the system receives a partial treatment sufficient to purify the water in that portion of the system before it reaches the main treatment tank. Where the system is applied to floating vessels, the introduction of treated water into the sea chests of the vessel protects a vulnerable portion of the vessel against attack by marine growths. The protection afforded here is of added importance in vessels which are required to remain stationary for any length of time in infested waters as the treated water introduced into the sea chests tends to spread to the water surrounding the ship's hull and thereby adding to the protection of the hull over a relatively large area. Another benefit to be obtained from the introduction of treated water into the sea chests is that there is usually a metallic couple present here in that the sea chest is usually of steel plate while the perforated plate C' covering the sea chest is usually of brass or manganese which would set up a corrosive reaction which will be eliminated by the use of selected anodes in the treatment tanks.

What I claim is:

1. A water circulating system for ships or the like including a treatment tank, a plurality of anodes disposed in said treatment tank, a source of D.C. current connected on its positive side to each of the anodes in the treatment tank and on its negative side to the walls of the treatment tank, said anodes comprising an arsenic copper alloy, the arsenic content of the anodes being approximately 6–7%, the balance copper, and deaerating valves in said treatment tank removing gas therefrom during the electrolytic treatment of the water.

2. An anode for use in a water circulating system comprising an arsenic copper alloy, the arsenic content of the anodes being approximately 6–7%, the balance copper.

3. In a water circulating system, a water inlet to the system, a main electrolytic treatment tank connected on one side to the water inlet and on the other side to the circulating system, a booster electrolytic treatment tank connected on its inlet side to the circulating system and on its outlet side to the water inlet leading to the main electrolytic treatment tank, anodes in said main and booster treatment tanks, said anodes comprising an arsenic copper alloy, the arsenic content of the anodes being approximately 6–7%, the balance copper, a source of D.C. current connected on its positive side to the anodes of the main and booster treatment tanks and on its negative side to the main and booster tanks, and valve means to regulate the volume of water passed from the circulating system into the booster treatment tank.

4. A sea water circulating system for ships or the like including a treatment tank, a plurality of anodes disposed in said treatment tank, a source of D.C. current connected on its positive side to each of the anodes in the treatment tank and on its negative side to the walls of the treatment tank, a first group of said anodes comprising an arsenic copper alloy, the arsenic content of the anodes being approximately 6–7%, the balance copper, a second group of said anodes comprising an aluminum alloy and deaerating valves in said treatment tank removing gas therefrom during the electrolytic treatment of the water.

5. In a sea water circulating system, a sea water inlet to the system, a main electrolytic treatment tank connected on one side to the sea water inlet and on the other side to the circulating system, a booster electrolytic treatment tank connected on its inlet side to the circulating system and on its outlet side to the water inlet leading to the main electrolytic treatment tank, anodes in said main and booster treatment tanks, said anodes in said main treatment tank comprising an arsenic copper alloy, the arsenic content of the anodes being approximately 6–7%, the balance copper, the anodes in the booster treatment tank comprising an aluminum alloy, a source of D.C. current connected on its positive side to the anodes of the main and booster tanks, and valve means to regulate the volume of water passed from the circulating system into the booster treatment tank, and deaerating valves for removing gas from the system during the electrolytic treatment of the water.

6. In a sea water circulating system for ships or the like, a sea chest open to the water in which the ship is afloat, a sea-well within the ship, the said sea well forming a reservoir on which the circulating systems of the ship draw their supply of water, a valved connection between said sea chest and said sea-well, a return water line from the ship's circulating system to said sea chest, anodes in said sea chest and sea-well, said anodes including an arsenic copper alloy, the arsenic content of the anodes being approximately 6–7%, the balance copper, and a source of D.C. current connected on its positive side to each of said anodes in the sea chest and sea-well and on its negative side to the walls of said sea chest and sea-well.

References Cited in the file of this patent

UNITED STATES PATENTS

| | | |
|---|---|---|
| 872,759 | Schoneberger et al. | Dec. 3, 1907 |
| 994,405 | James | June 6, 1911 |
| 2,777,811 | McCrae et al. | Jan. 15, 1957 |
| 2,848,402 | Van Dorsser et al. | Aug. 19, 1958 |

FOREIGN PATENTS

| | | |
|---|---|---|
| 662,625 | Great Britain | Dec. 5, 1951 |